United States Patent
Bae et al.

(10) Patent No.: US 12,444,924 B2
(45) Date of Patent: Oct. 14, 2025

(54) DC-DC CONVERTER

(71) Applicant: LS ELECTRIC CO., LTD., Anyang-si (KR)

(72) Inventors: Sun Ho Bae, Anyang-si (KR); Jae Ho Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 141 days.

(21) Appl. No.: 18/274,406

(22) PCT Filed: Mar. 21, 2022

(86) PCT No.: PCT/KR2022/003904
§ 371 (c)(1),
(2) Date: Jul. 26, 2023

(87) PCT Pub. No.: WO2022/225197
PCT Pub. Date: Oct. 27, 2022

(65) Prior Publication Data
US 2024/0088643 A1    Mar. 14, 2024

(30) Foreign Application Priority Data
Apr. 22, 2021 (KR) .................. 10-2021-0052425

(51) Int. Cl.
*H02M 3/158* (2006.01)
*H02H 7/12* (2006.01)

(52) U.S. Cl.
CPC .......... *H02H 7/1213* (2013.01); *H02M 3/158* (2013.01)

(58) Field of Classification Search
CPC ........ H02M 3/158; H02M 3/07; H02M 3/156; H02M 3/01; H02M 3/155; H02M 3/33569; H02M 3/073; H02M 3/33576; H02M 3/33507; H02H 9/046; H02H 9/04; H02H 7/1213
See application file for complete search history.

(56) References Cited

U.S. PATENT DOCUMENTS

2021/0359606 A1* 11/2021 Han ............... H02M 1/0054
2024/0088643 A1    3/2024 Bae et al.

FOREIGN PATENT DOCUMENTS

| EP | 2650999 A1 | 10/2013 |
| JP | 5975687 B2 | 8/2016 |
| JP | 2019092242 A | 6/2019 |
| KR | 20120117940 A | 10/2012 |
| KR | 101542940 B1 | 8/2015 |

(Continued)

OTHER PUBLICATIONS

Notice of Allowance for related Korean Application No. 10-2021-0052425; action dated Jan. 23, 2024; (1 page).

(Continued)

*Primary Examiner* — Bryan R Perez
(74) *Attorney, Agent, or Firm* — K&L Gates LLP

(57) ABSTRACT

A DC-DC converter can include a driving circuit comprising a switch part and a flying capacitor configured to convert an input voltage of an input side into an output voltage of an output side, and a protection circuit configured to be connected to the output side. The protection circuit can be configured to block the fault current flowing to the switch part by lowering the output voltage step by step when a fault occurs.

11 Claims, 7 Drawing Sheets

(56) References Cited

FOREIGN PATENT DOCUMENTS

| KR | 20150091729 A | 8/2015 |
| KR | 20180054021 A | 5/2018 |
| KR | 20220145625 A | 10/2022 |

OTHER PUBLICATIONS

International Search Report for related International Application No. PCT/KR2022/003904; action dated Oct. 27, 2022; (3 pages).
Written Opinion for related International Application No. PCT/KR2022/003904; action dated Oct. 27, 2022; (3 pages).

* cited by examiner

DC-DC CONVERTER

CROSS-REFERENCE TO RELATED APPLICATIONS

This application is the National Stage filing under 35 U.S.C. 371 of International Application No. PCT/KR2022/003904, filed on Mar. 21, 2022, which claims the benefit of earlier filing date of and right of priority to Korean Application No. 10-2021-0052425 filed on Apr. 22, 2021, the contents of which are incorporated by reference herein in their entirety.

FIELD

The embodiment relates to a DC-DC converter.

BACKGROUND

In recent years, electric vehicles have been rapidly increasing, and these electric vehicles are driven by using a battery as a power source. In addition, a direct-current (DC) power source is used in renewable energy fields such as solar power generation, and the voltage level used is increasing.

In the field of electric vehicles or renewable energy, a DC-DC converter capable of obtaining a large output voltage is required. The DC-DC converter obtains a large output voltage by using switches with relatively small rated voltages, respectively. In order to obtain a larger output voltage, switches with a higher rated voltage need to be used. However, since the higher the rated voltage, the higher the unit price of the switch, it is not easy to adopt switches with a higher rated voltage in a DC-DC converter.

In order to solve this problem, a method of increasing the rated voltage by configuring relatively inexpensive switches having a rated voltage in series has been proposed.

As shown in FIG. 1, a multi-level converter in which a flying capacitor $C_F$ is connected between a plurality of switches S1 to S4 has been proposed. That is, one side of the flying capacitor $C_F$ is connected to a node between a first switch S1 and a second switch S2, and the other side of the flying capacitor $C_F$ is connected to a third switch S3 and a fourth switch S4. Accordingly, a high output voltage can be obtained using the switches S1 to S4 with low voltages, respectively, through the voltage applied to the flying capacitor $C_F$. Since the operation of the multi-level converter is well known, detailed descriptions are omitted.

Meanwhile, when the related-art DC-DC converter is connected to a battery and used, unexpected faults often occur. For example, a fault occurs due to a short circuit on an output side of the related-art DC-DC converter. As shown in FIG. 1, when a short circuit occurs on an output side of the multi-level converter, an input side and the output side are conducted through diodes of the switches S1 to S4. In this case, a high output voltage on the output side is applied to the switches S1 to S4 and the switches S1 to S4 are damaged.

To prevent this problem, a fuse or relay switch is connected to the input or output side of the multi-level converter shown in FIG. 1.

However, since the response speed of the relay switch is slow, the relay switch cannot quickly cut off the conduction of the input side and the output side of the multi-level converter when a fault occurs. Thus, there is a problem in that the relay switch cannot be used for the purpose of protecting the switches used in the converter.

In addition, since the fuse is disposable, it has to be replaced every time a fault occurs, resulting in high replacement cost.

SUMMARY

The embodiment is aimed at solving the foregoing and other problems.

Another object of the embodiment is to provide a DC-DC converter capable of fundamentally blocking fault current in the event of a fault.

According to one aspect of the embodiment to achieve the above or other object, a DC-DC converter, comprising: a driving circuit comprising a switch part and a flying capacitor configured to convert an input voltage of an input side into an output voltage of an output side; and a protection circuit configured to be connected to the output side, wherein the protection circuit is configured to block the fault current flowing to the switch part by lowering the output voltage step by step when a fault occurs.

The effects of the DC-DC converter according to the embodiments are described as follows.

According to at least one of the embodiments, when a fault occurs, it is possible to fundamentally block the fault current from flowing into a driving circuit, thereby preventing damage to the switches of the driving circuit.

For example, as shown in FIGS. 4 and 5, when a fault occurs, the sixth switch S6 is turned off to prevent the fault current from flowing into the drive circuit 11 so that the power is cut off and no more fault current occurs. Accordingly, the switches S1 to S4 of the drive circuit 11 and all elements or electronic components of the protection circuit 13 cannot be damaged from the fault current.

In addition, even if the sixth switch S6 is turned off, ½ voltage of the second charging voltage $V_{C2}$ of the second capacitor C2, that is, the output voltage $V_I$ can be applied to both ends of the sixth switch S6 so that the sixth switch S6 is not damaged. In addition, the output voltage Vo between both ends of the first node N1 and the fifth node N5 can also become ½ voltage of the first charging voltage $V_{C1}$ of the first capacitor C1, that is, the output voltage $V_I$. Therefore, the diode D4 or the switch S5 on the path through which the output current Io flows cannot be damaged.

After the sixth switch S6 is turned off and a certain amount of time has elapsed, the fifth switch S5 can be turned off so that the fault current can flow only through the first diode D1 and the second diode D2 and the fault current can flow through the driving circuit. The switch part S1 to S4 of the driving circuit 11 cannot be damaged from the fault current. In addition, even if the fifth switch S5 is turned off, ½ voltage of the first charging voltage $V_{C1}$ of the first capacitor C1, that is, the output voltage $V_I$ is applied to both ends of the fifth switch S5 so that the fifth switch S5 cannot be damaged. Since the output voltage Vo between both ends of the first node N1 and the fifth node N5 is 0V, almost no current flows through the first diode D1 and the second diode D2 so damages to the first diode D1 and the second diode D2 can be prevented.

In addition, by first turning off the sixth switch S6 and then turning off the fifth switch S5, the fault current can flow to the first diode D1 and the second diode D2 at once so that the first diode D1 and the second diode D2 can be prevented from being damaged.

In addition, the rated voltage of the sixth switch S6 can be set to be greater than the second charged voltage $V_{C2}$ of the second capacitor C2, and the rated voltage of the fifth switch S5 can be set to be greater than the first charged voltage of the first capacitor C1. Thus, when each of the fifth and sixth switches S5 and S6 is turned off, the fifth and sixth switches S5 and S6 cannot be damaged by the voltages $V_{C1}$ and $V_{C2}$ charged in the first and second capacitors C1 and C2, respectively.

A further scope of applicability of the embodiment will become apparent from the detailed description that follows. However, since various changes and modifications within the spirit and scope of the embodiment can be clearly understood by those skilled in the art, it should be understood that the detailed description and specific embodiment, such as preferred embodiment, are given by way of example only.

DETAILED DESCRIPTION

Figure 1:
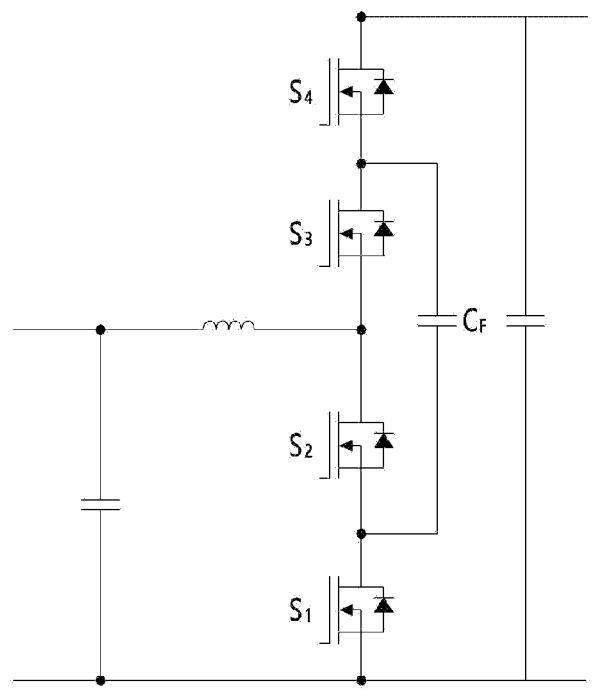
FIG. 1 is a circuit diagram showing a multi-level converter in the related-art.

Hereinafter, the embodiment disclosed in this specification will be described in detail with reference to the accompanying drawings, but the same or similar elements are given the same reference numerals regardless of reference numerals, and redundant descriptions thereof will be omitted. The suffixes 'module' and 'unit' for the elements used in the following descriptions are given or used interchangeably in consideration of ease of writing the specification, and do not themselves have a meaning or role that is distinct from each other. In addition, the accompanying drawings are for easy understanding of the embodiment disclosed in this specification, and the technical idea disclosed in this specification is not limited by the accompanying drawings. Also, when an element such as a layer, region or substrate is referred to as being 'on' another element, this means that there can be directly on the other element or be other intermediate elements therebetween.

Figure 2:
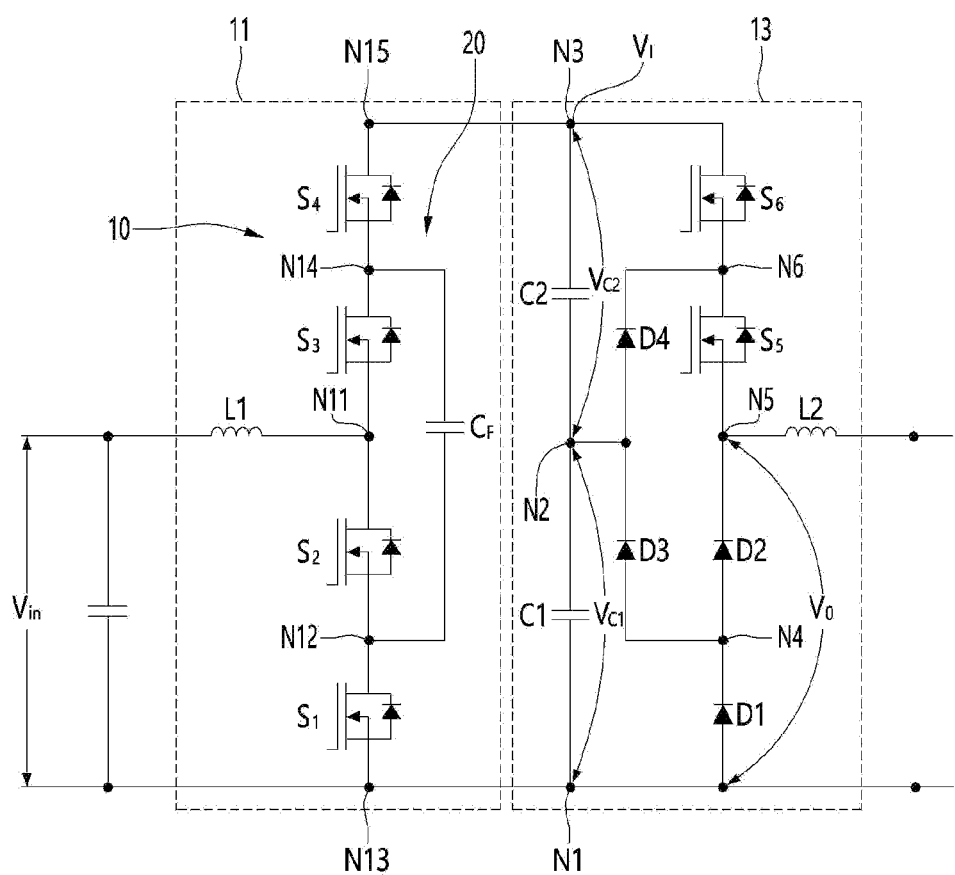
FIG. 2 is a circuit diagram showing a DC-DC converter according to an embodiment.

FIG. 2 is a circuit diagram showing a DC-DC converter according to an embodiment.

Referring to FIG. 2, the DC-DC converter according to the embodiment can comprise a driving circuit 11 and a protection circuit 13.

The DC-DC converter can be referred to as, for example, a multi-level converter.

The driving circuit 11 can convert an input voltage Vin of an input side 10 to an output voltage Vo of an output side 20 during normal operation. For example, the driving circuit 11 can boost or step down the input voltage Vin of the input side 10 to the output voltage Vo of the output side 20 during the normal operation. In addition, the protection circuit 13 can serve to protect the driving circuit 11 in the event of a fault.

The normal operation can mean a case in which a fault does not occur. Occurrence of a fault can mean that a problem, such as a short circuit, occurs in the output side 20. For example, as a fault, both terminals of the output side 20 can be electrically shorted. In this case, the output current of the output side 20 of the driving circuit 11 can flow into the driving circuit, and electronic elements of the driving circuit 11, for example, switches S1 to S4 can be damaged.

The driving circuit 11 can comprise a plurality of switches S1 to S4 and a flying capacitor $C_F$.

When operating normally, that is, when a fault does not occur, the driving circuit 11 can boost the input voltage Vin of the input side 10 to the output voltage Vo of the output side 20.

For example, during an operation of normal output voltage Vo, positive (+) output current and negative (−) output current can be output as the output current.

Meanwhile, the protection circuit 13 can be connected to the output side 20 of the driving circuit 11 to fundamentally block the flow of fault current into the driving circuit 11 when a fault occurs. That is, when a fault occurs, the protection circuit 13 can lower the output voltage Vo between both ends of a first node N1 and a fifth node N5 step by step to block the fault current flowing to the switch part S1 to S4 of the driving circuit 11.

The protection circuit 13 can comprise a first capacitor C1, a second capacitor C2, first to fourth diodes D1 to D4, a fifth switch S5 and a sixth switch S6. The fifth switch S5 and the sixth switch S6 can be referred to as a first switch S1 and a second switch S2, respectively. Alternatively, the fifth switch S5 and the sixth switch S6 can be referred to as a second switch S2 and a first switch S1, respectively.

For example, the first capacitor C1 can be connected between the first node N1 and the second node N2, and the second capacitor C2 can be connected between a second node N2 and a third node N3. The first node N1 can be a third node N13 of the driving circuit 11, and the third node N3 can be a fifth node N15 of the driving circuit 11.

For example, a first diode D1 can be connected between the first node N1 and a fourth node N4, and a second diode D2 can be connected between the fourth node N4 and the fifth node N5. For example, a third diode D3 can be connected between the second node N2 and the fourth node N4, and a fourth diode D4 can be connected between the second node N2 and a sixth node N6. For example, the fifth switch S5 can be connected between the fifth node N5 and the sixth node N6, and the sixth switch S6 can be connected between the third node N3 and the sixth node N6.

The fifth switch S5 can be connected between the fifth node N5 and the sixth node N6, and the sixth switch S6 can be connected between the third node N3 and the sixth node N6.

The DC-DC converter of the embodiment configured as described above can be operated differently during normal operation and fault operation.

Hereinafter, the operation of the DC-DC converter during normal operation and fault operation will be described with reference to FIGS. 3 to 6.

Figure 3:
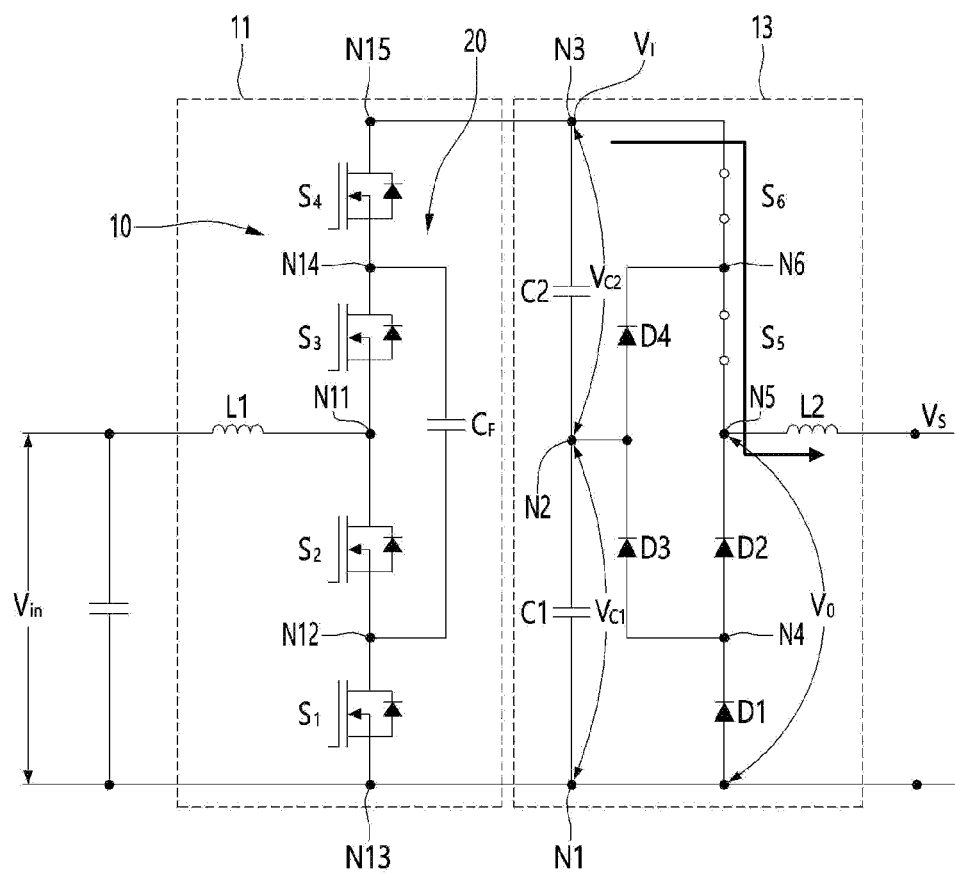
FIGS. 3 to 6 are circuit diagrams illustrating an operation of a DC-DC converter according to an embodiment.
Figure 4:
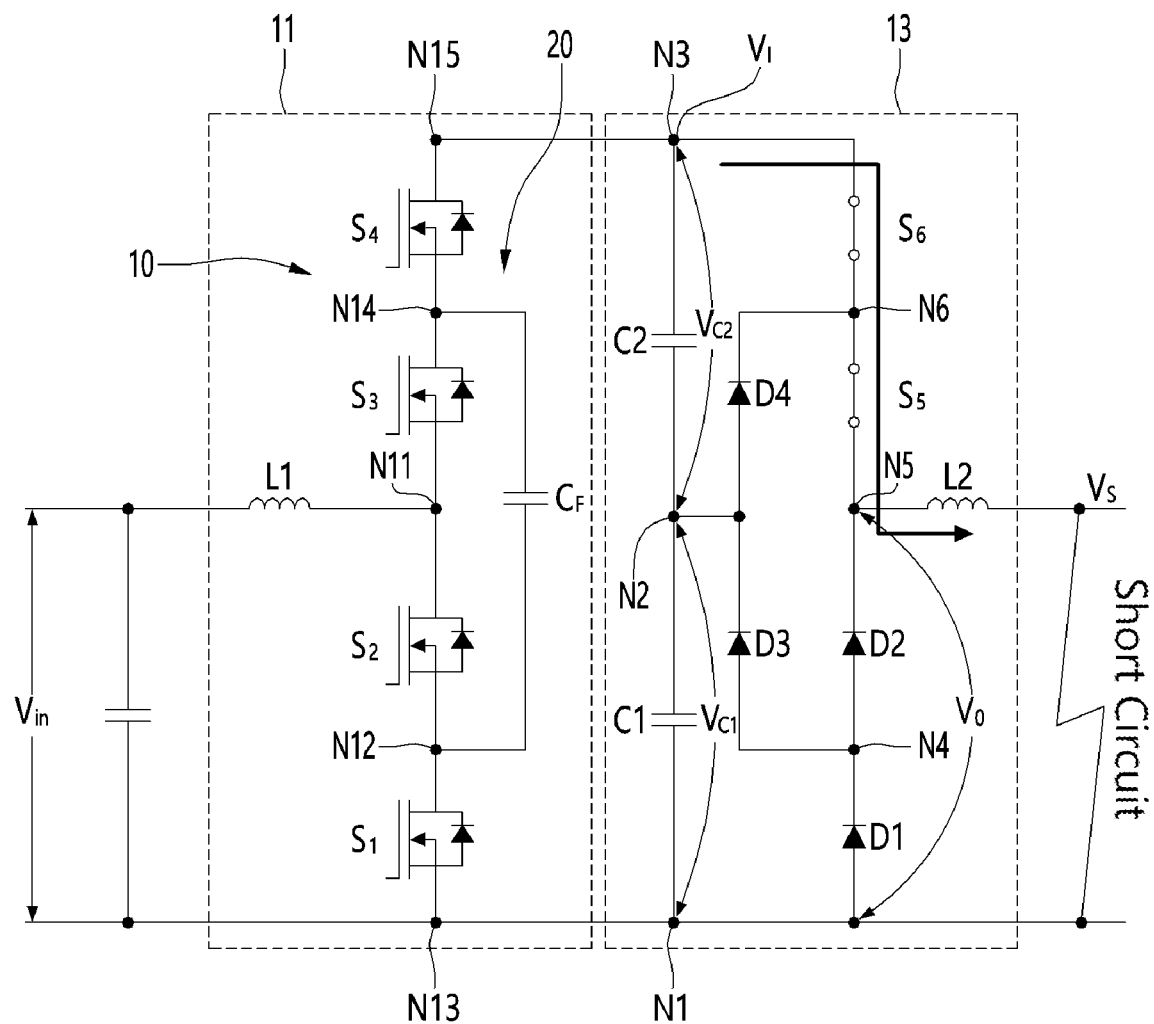
Figure 5:
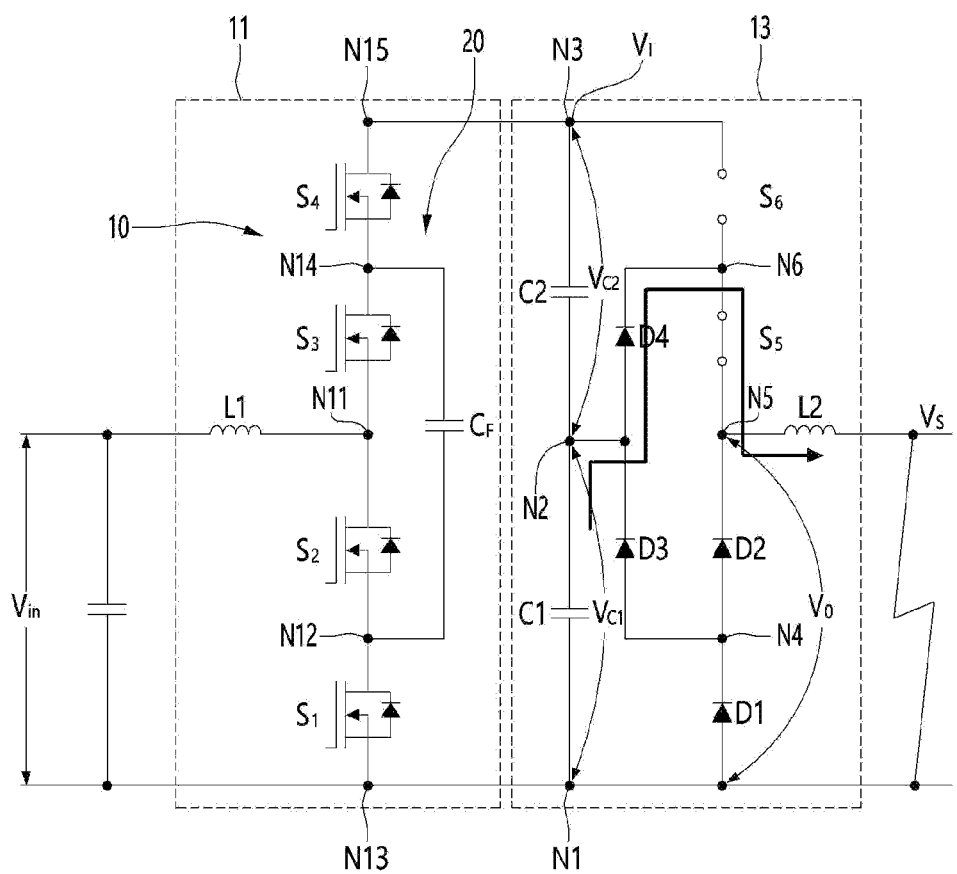
Figure 6:
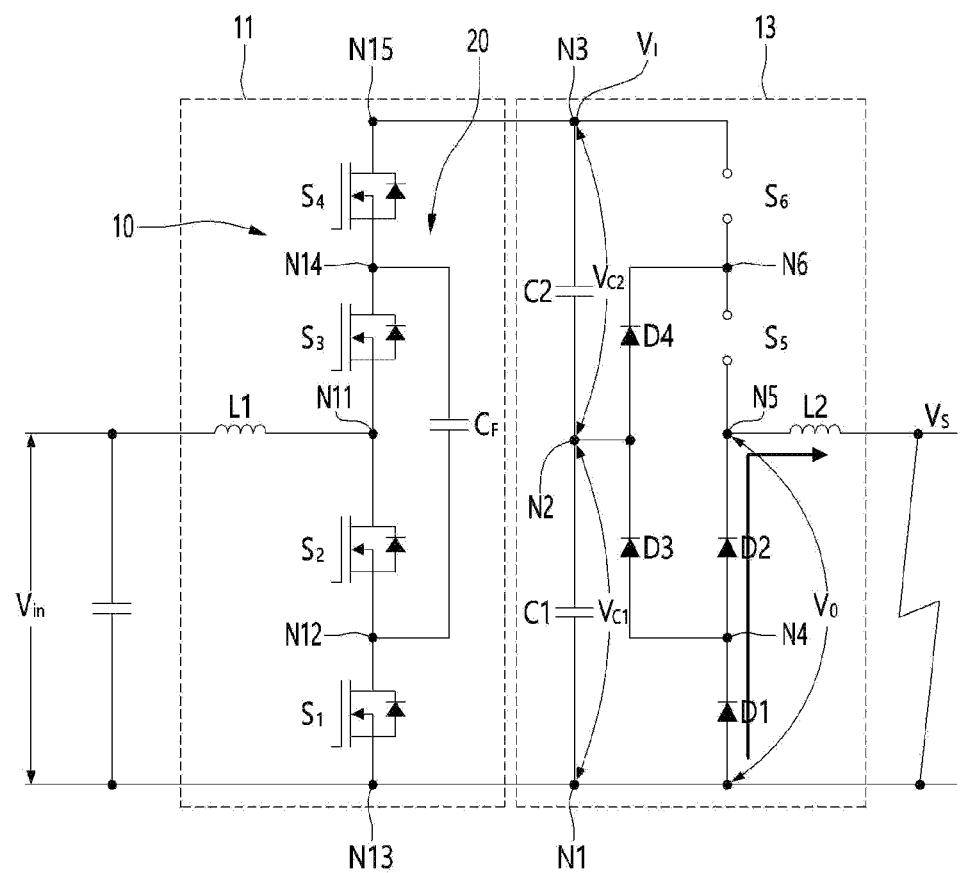

FIG. 3 describes the operation of the DC-DC converter during normal operation, and FIGS. 4 to 6 describe the operation of the DC-DC converter during fault operation. A fault can be, for example, a short circuit, but is not limited thereto.

[Normal Operation]

During normal operation, the switch part S1 to S4 and the flying capacitor $C_F$ of the driving circuit 11 can output an output voltage Vo from the driving circuit 11 at each operation period.

For example, the output voltage Vo of the driving circuit 11 can be the voltage $V_f$ between the first node N1 and the third node N3 of the protection circuit 13.

Figure 7:
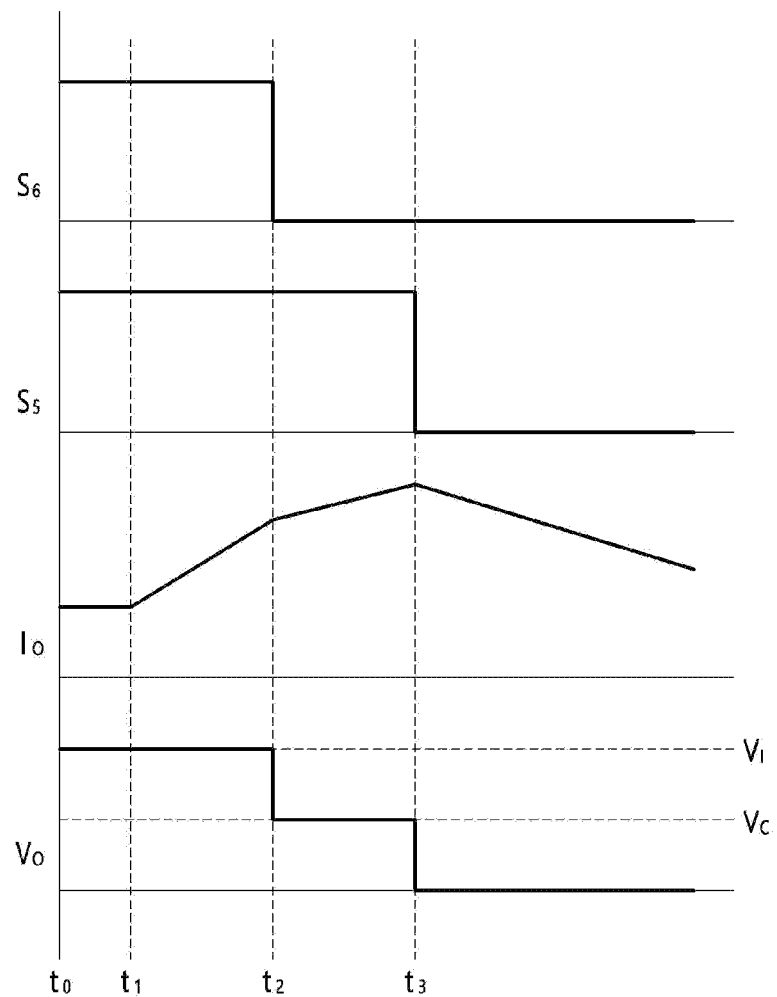
FIG. 7 is a waveform diagram illustrating an operation of a DC-DC converter according to an embodiment.

In FIG. 7, the normal operation can be a section from t0 to t1. During the normal operation, the fifth switch S5 and the sixth switch S6 of the protection circuit 13 can be turned on. Accordingly, as shown in FIG. 7, the voltage $V_f$ between the first node N1 and the third node N3 of the protection circuit 13 during normal operation can be equal to the voltage Vo between the first node N1 and the fifth node N5. At this time, the output current can be Io.

The output voltage $V_I$ of the driving circuit 11 can be distributed and charged by the first capacitor C1 and the second capacitor C2. For example, the capacitance value of the first capacitor C1 can be the same as or different from the capacitance value of the second capacitor C2, but is not limited thereto. In this case, ½ voltage of the output voltage $V_I$ of the driving circuit 11 can be charged in the first capacitor C1 as the first charge voltage $V_{C1}$, and the remainder voltage, that is, ½ voltage of the output voltage $V_I$ of the driving circuit 11 can be charged in the second capacitor C2 as the second charging voltage $V_{C2}$. Accordingly, the output voltage $V_I$ of the driving circuit 11 can be the sum of the first charging voltage $V_{C1}$ and the second charging voltage $V_{C2}$. The rated voltage of the fifth switch S5 and the rated voltage of the sixth switch S6 can be determined according to the first charging voltage $V_{C1}$ and the second charging voltage $V$ $V_{C2}$, respectively. For example, a fifth switch S5 having a higher rated voltage than the first charging voltage $V_{C1}$ of the first capacitor C1 can be adopted, and a sixth switch S6 having a higher rated voltage than the second charging voltage $V_{C2}$ of the second capacitor C2 can be adopted.

[Fault Operation]

When a fault, for example, a short circuit occurs during normal operation, it can operate as shown in FIGS. 4 to 6. That is, in order to lower the output voltage $V_I$ of the driving circuit 11 step by step when a fault occurs, the protective circuit 13 can be operated by dividing into a first section and a second section. In FIG. 7, the first section can be defined as a section between t1 and t2, and the second section can be defined as a section after t3. For example, the sixth switch S6 can be turned off at time t2 and the fifth switch S5 can be turned off at time t3.

First, as shown in FIGS. 4 and 7, a short circuit can occur in the output side 20 of the protection circuit 13 during normal operation. In this case, the fault current (or the output current Io) can be instantaneously increased and flow through the diodes of the switch part S1 to S4 and the turned-on fifth and sixth switches S5 and S6.

When the output current Io increases but exceeds a set value, the sixth switch S6 can be turned off as shown in FIG. 5. That is, as shown in FIG. 7, the sixth switch S6 can be turned off at time t2 when the output current Io exceeds the set value.

Although not shown, a current detector can be installed between the third node N3 and the sixth switch S6, but is not limited thereto. The current detector can be installed on the input side 10 of the drive circuit 22. An output current Io flowing from the third node N3 to the sixth switch S6 can be detected by the current detector.

When the output current Io detected by the current detector exceeds a set value, the sixth switch S6 can be turned off.

When the sixth switch S6 is turned off, the output current Io cannot flow through the sixth switch S6. In addition, since the sixth switch S6 is turned off, ½ voltage of the second charging voltage $V_{C2}$ of the second capacitor C2, that is, the output voltage $V_I$ of the driving circuit 11 is applied to both ends of the sixth switch S6. For example, the rated voltage of the sixth switch S6 can be greater than the second charging voltage $V_{C2}$ of the second capacitor C2. Therefore, even if ½ voltage of the second charged voltage $V_{C2}$ of the second capacitor C2, that is, the output voltage $V_I$ of the driving circuit 11 is applied to both ends of the sixth switch S6, the sixth switch S6 cannot be damaged.

Meanwhile, a current path through which the output current Io flows to an inductor L2 via the fourth diode D4 and the fifth switch S5 can be formed by the first charging voltage $V_{C1}$ of the first capacitor C1. Therefore, ½ voltage of the first charged voltage $V_{C1}$ of the first capacitor C1, that is, the output voltage $V_I$ of the driving circuit 11 can be applied to the output voltage Vo between the first node N1 and the fifth node N5. Accordingly, the output voltage Vo reduced to ½ voltage can be output through both ends between the first node N1 and the fifth node N5.

According to the embodiment, when a fault occurs and the output current Io increases and exceeds the set value, the sixth switch S6 can be turned off. Thus, the fault current, that is, the output current Io of the driving circuit 11 does not flow to the switch part S1 to S4 of the driving circuit 11 so that damage to the switch part S1 to S4 of the driving circuit 11 can be prevented.

Meanwhile, after the fifth switch S5 can be turned off and a certain amount of time has elapsed, the sixth switch S6 can be turned off. As shown in FIG. 7, a time point at which the fifth switch S5 is turned off can be t3. For example, the first section can be defined as a section from the turn-off time t2 of the sixth switch S6 to the turn-off time t3 of the fifth switch S5. For example, the second section can be defined as a section after t3.

For example, the turn-off time of the fifth switch S5 can be determined in consideration of an inductance of the inductor L2. For example, the turn-off time of the fifth switch S5 can be determined in consideration of the output current Io detected by the current detector. For example, when the output current Io detected by the current detector exceeds a second set value, the fifth switch S5 can be turned off. The second set value can be greater than a set value used to turn off the sixth switch S6. The set value used to turn off the sixth switch S6 can be referred to as a first set value.

As shown in FIG. 6, as the fifth switch S5 is turned off, the current path through which the output current Io flows to the inductor L2 via the first diode D1 and the second diode D2 can be formed. In this case, the output voltage Vo between both ends of the first node N1 and the fifth node N5 can be 0V. In addition, ½ voltage of the first charged voltage $V_{C1}$ of the first capacitor C1, that is, the output voltage $V_I$ of the driving circuit 11 can be applied to both ends of the fifth switch S5.

The first charging voltage $V_{C1}$ of the first capacitor C1 cannot be discharged through the fourth node N4 by the third diode D3, and can be discharged only through the first diode D1 and the second diode D2.

In addition, as the fifth switch S5 is turned off, ½ voltage of the first charging voltage $V_{C1}$ of the first capacitor C1, that is, the output voltage $V_I$ of the driving circuit 11 can be applied to both ends of the fifth switch S5. For example, the rated voltage of the fifth switch S5 can be greater than the first charging voltage $V_{C1}$ of the first capacitor C1. Therefore, even if ½ voltage of the first charged voltage $V_{C1}$ of the first capacitor C1, that is, the output voltage $V_I$ of the driving circuit 11 is applied to both ends of the fifth switch S5, the fifth switch S5 cannot be damaged.

In summary, when a fault occurs, the sixth switch S6 can be turned off in the first section so that the fault current does not flow to the driving circuit 11. Thus, the switch part S1 to S4 of the driving circuit 11 cannot be damaged from the fault current. In addition, even if the sixth switch S6 is turned off, ½ voltage of the second charging voltage $V_{C2}$ of the second capacitor C2, that is, the output voltage $V_I$ of the driving circuit 11 can be applied to both ends of the sixth switch S6. Thus, the sixth switch S6 cannot be damaged. In addition, the output voltage Vo between both ends of the first node N1 and the fifth node N5 can also become ½ voltage of the first charging voltage $V_{C1}$ of the first capacitor C1, that is, the output voltage $V_I$ of the driving circuit 11. Thus, the diode D4 or the switch S5 on the path through which the output current Io flows cannot be damaged.

In the second section, the fifth switch S5 can be turned off so that the fault current flows only through the first and second diodes D1 and D2 and does not flow the fault current into the driving circuit 11. Accordingly, the switch part S1 to S4 of the driving circuit 11 cannot be damaged from the fault current. In addition, even if the fifth switch S5 is turned off, ½ voltage of the first charging voltage $V_{C1}$ of the first capacitor C1, that is, the output voltage $V_I$ of the driving circuit 11 can be applied to both ends of the fifth switch S5 so that the fifth switch S5 cannot be damaged. Since the output voltage Vo between both ends of the first node N1 and the fifth node N5 is 0V, almost no current flows through the first diode D1 and the second diode D2 so that damages to the first diode D1 and the second diode D2 can be prevented.

In addition, by first turning off the sixth switch S6 and then turning off the fifth switch S5, the fault current can flow to the first diode D1 and the second diode D2 at once so that the first diode D1 And the second diode D2 can be prevented from being damaged.

In addition, the rated voltage of the sixth switch S6 can be set to be greater than the second charged voltage $V_{C2}$ of the second capacitor C2, and the rated voltage of the fifth switch S5 can be set to be greater than the first charged voltage $V_{C1}$ of the first capacitor C1. Thus, when each of the fifth and sixth switches S5 and S6 is turned off, the fifth and sixth switches S5 and S6 cannot be damaged by the voltage charged in the first and second capacitors C1 and C2, respectively.

Meanwhile, an inductor L1 for preventing sudden supply of input current at the input side 10 of the driving circuit 11 can be connected to the first node N11, and the inductor L2 for preventing sudden supply of the output current Io at the output side 20 of the protection circuit 13 can be connected to the fifth node N5.

In the above description, the drive circuit 11 is described as boosting the input voltage Vin of the input side 10 to the output voltage Vo of the output side 20, but is not limited thereto. The DC-DC converter of the embodiment can be capable of bi-directional operation. That is, the driving circuit 11 not only boosts the input voltage Vin of the input side 10 to the output voltage Vo of the output side 20, but also converts the voltage of the output side 20 to the voltage required by the input side 10.

The above detailed description should not be construed as limiting in all respects and should be considered illustrative. The scope of the embodiment should be determined by reasonable interpretation of the appended claims, and all changes within the equivalent range of the embodiment are included in the scope of the embodiment.

The embodiment can be applied to electric vehicles or renewable energy fields.

The invention claimed is:

1. A DC-DC converter, comprising:
    a driving circuit comprising a switch part and a flying capacitor configured to convert an input voltage of an input side into an output voltage of an output side; and
    a protection circuit configured to be connected to the output side,
    wherein the protection circuit is configured to block a fault current flowing to the switch part by lowering the output voltage step by step when a fault occurs, and
    wherein the protection circuit comprises:
    a first capacitor configured to be connected between a first node and a second node;
    a second capacitor configured to be connected between the second node and a third node;
    a first diode configured to be connected between the first node and a fourth node;
    a second diode configured to be connected between the fourth node and a fifth node;
    a third diode configured to be connected between the second node and the fourth node;
    a fourth diode configured to be connected between the second node and a sixth node;
    a fifth switch configured to be connected between the fifth node and the sixth node; and
    a sixth switch configured to be connected between the third node and the sixth node.

2. The DC-DC converter of claim 1, wherein the output voltage is a voltage between the first node and the fifth node.

3. The DC-DC converter of claim 1, wherein the output voltage is configured to be distributed and charged to the first capacitor and the second capacitor.

4. The DC-DC converter of claim 1, wherein it is divided into a first section and a second section to lower the output voltage step by step in the event of a fault.

5. The DC-DC converter of claim 4, wherein in the first section, when an output current exceeds a set value in the event of the fault, the sixth switch is configured to be turned off so that the output voltage is configured to be reduced to a voltage charged in the first capacitor.

6. The DC-DC converter of claim 5, wherein when the sixth switch is turned off, a current path flowing from the first capacitor to the fifth node via the fourth diode and the fifth switch is formed.

7. The DC-DC converter of claim 5, wherein a voltage between both ends of the turned-off sixth switch is a voltage charged in the second capacitor.

8. The DC-DC converter of claim 4, wherein in the second section, the fifth switch is configured to be turned off so that the output voltage is configured to be reduced to 0V.

9. The DC-DC converter of claim 8, wherein when the fifth switch is turned off, a current path flowing from the first diode to the fifth node via the second diode is formed.

10. The DC-DC converter of claim 8, wherein a voltage between both ends of the turned-off fifth switch is a voltage charged in the first capacitor.

11. The DC-DC converter of claim 8, wherein after the sixth switch is turned off and a certain amount of time has elapsed, the fifth switch is configured to be turned off.

* * * * *